(12) United States Patent
Corre et al.

(10) Patent No.: US 11,674,094 B2
(45) Date of Patent: Jun. 13, 2023

(54) CO-MIXED CATALYST PRODUCED FROM SOLUTIONS CONTAINING HETEROPOLYANIONS, METHOD FOR THE PRODUCTION THEREOF, AND USE OF SAME IN HYDROCONVERSION OF HEAVY HYDROCARBON FEEDSTOCK

(71) Applicant: IFP Energies nouvelles, Rueil-Malmaison (FR)

(72) Inventors: Thibault Corre, Rueil-Malmaison (FR); Mathieu Digne, Rueil-Malmaison (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 154 days.

(21) Appl. No.: 17/262,530

(22) PCT Filed: Jul. 18, 2019

(86) PCT No.: PCT/EP2019/069367
§ 371 (c)(1),
(2) Date: Jan. 22, 2021

(87) PCT Pub. No.: WO2020/020740
PCT Pub. Date: Jan. 30, 2020

(65) Prior Publication Data
US 2021/0292662 A1    Sep. 23, 2021

(30) Foreign Application Priority Data
Jul. 23, 2018  (FR) ..................... 1856810

(51) Int. Cl.
| | | |
|---|---|---|
| *C10G 65/12* | (2006.01) | |
| *B01J 23/883* | (2006.01) | |
| *B01J 35/10* | (2006.01) | |
| *B01J 21/04* | (2006.01) | |
| *B01J 37/00* | (2006.01) | |
| *B01J 37/02* | (2006.01) | |
| *B01J 37/04* | (2006.01) | |
| *B01J 37/06* | (2006.01) | |
| *B01J 37/08* | (2006.01) | |
| *C10G 45/08* | (2006.01) | |
| *C10G 47/04* | (2006.01) | |

(52) U.S. Cl.
CPC ............. *C10G 65/12* (2013.01); *B01J 21/04* (2013.01); *B01J 23/883* (2013.01); *B01J 35/109* (2013.01); *B01J 35/1019* (2013.01); *B01J 35/1042* (2013.01); *B01J 35/1066* (2013.01); *B01J 35/1076* (2013.01); *B01J 37/009* (2013.01); *B01J 37/0063* (2013.01); *B01J 37/0213* (2013.01); *B01J 37/04* (2013.01); *B01J 37/06* (2013.01); *B01J 37/082* (2013.01); *C10G 45/08* (2013.01); *C10G 47/04* (2013.01); *C10G 2300/202* (2013.01); *C10G 2300/205* (2013.01); *C10G 2300/206* (2013.01)

(58) Field of Classification Search
CPC .......... C10G 65/12; C10G 45/08; B01J 21/04; B01J 23/883; B01J 35/1019; B01J 35/1042; B01J 35/1066; B01J 35/1076; B01J 35/109
See application file for complete search history.

(56) References Cited

U.S. PATENT DOCUMENTS

| | | | |
|---|---|---|---|
| 4,717,706 A | 1/1988 | Kemp | |
| 7,232,515 B1 | 6/2007 | Demmin et al. | |
| 2008/0020926 A1* | 1/2008 | Guillaume | B01J 23/883 502/314 |
| 2013/0334099 A1* | 12/2013 | Marchand | B01J 29/045 208/89 |
| 2017/0137725 A1 | 5/2017 | Boualleg et al. | |
| 2017/0151555 A1 | 6/2017 | Boualleg et al. | |

FOREIGN PATENT DOCUMENTS

| | | |
|---|---|---|
| FR | 3022156 A1 | 12/2015 |
| FR | 3022800 A1 | 1/2016 |

OTHER PUBLICATIONS

International Search Report PCT/EP2019/069367 dated Aug. 27, 2019 (pp. 1-2).

* cited by examiner

*Primary Examiner* — Renee Robinson
(74) *Attorney, Agent, or Firm* — Millen White Zelano and Branigan, PC; Csaba Henter

(57) ABSTRACT

The present invention relates to a process for the preparation of catalyst(s), comprising the cokneading of boehmite with an active phase comprising a salt of heteropolyanion of Keggin and/or lacunary Keggin and/or substituted lacunary Keggin and/or Anderson and/or Strandberg type, and their mixtures, exhibiting, in its structure, molybdenum and cobalt and/or nickel. The present invention also relates to a process for the hydrotreating and/or hydroconversion of a heavy hydrocarbon feedstock in the presence of catalyst(s) prepared according to said process.

16 Claims, No Drawings

CO-MIXED CATALYST PRODUCED FROM SOLUTIONS CONTAINING HETEROPOLYANIONS, METHOD FOR THE PRODUCTION THEREOF, AND USE OF SAME IN HYDROCONVERSION OF HEAVY HYDROCARBON FEEDSTOCK

TECHNICAL FIELD OF THE INVENTION

The present invention relates to a process for the preparation of catalysts and to their uses in processes for the hydrotreating and/or hydroconversion of heavy hydrocarbon feedstocks.

PRIOR ART

The purification and the conversion of heavy hydrocarbon feedstocks is becoming increasingly important in the practice of refining with the increasing need to reduce the amount of sulfur in petroleum cuts and to convert heavy fractions (the boiling point of which is greater than 370° C.) into lighter fractions which can be upgraded as fuel.

This is because, given the specifications imposed by each country for commercial fuels, it is necessary to upgrade as much as possible imported crudes increasingly rich in heavy fractions and heteroatoms and increasingly poor in hydrogen.

Several refining schemes involving various types of processes exist for the treatment of heavy petroleum feedstocks. Zong et al. (Recent Patents on Chemical Engineering, 2009, 2, 22-36) summarize the various processes known in this field. Among these, two main processes for hydrotreating and for hydroconversion of atmospheric residues or of vacuum residues (VR) exist commercially:

- fixed bed processes, for example the process known under the name of HYVAHL-F™ described in the patent FR 2 681 871,
- ebullated bed processes, for example the process known under the name of H-OIL™ described in the patents U.S. Pat. Nos. 4,521,295, 4,457,831 and 4,354,852.

It is known to a person skilled in the art that hydrotreating and hydroconversion processes make it possible, by bringing a heavy hydrocarbon feedstock into contact with a supported catalyst, that is to say a catalyst consisting of a support and of an active phase dispersed on this support, to significantly reduce its content of asphaltenes, metals, sulfur and other impurities, while increasing the hydrogen to carbon (H/C) ratio and while transforming it more or less partially into lighter cuts.

The processes for hydrotreating residues in a fixed bed (commonly called "Resid DeSulfurization unit" or RDS) result in high refining performances. This is because they make it possible to produce a cut with a boiling point of greater than 370° C. containing less than 0.5% by weight of sulfur and less than 20 ppm of metals (in particular nickel and vanadium) starting from feedstocks containing up to 5% by weight of sulfur and up to 250 ppm of metals. On the other hand, the hydroconversion of the residue into lighter cuts than the atmospheric residue (gas oil and gasoline in particular) is relatively low, and typically of the order of 10% to 20% by weight. In such a process, the feedstock, premixed with hydrogen, circulates through several fixed bed reactors arranged in series and filled with catalysts. The total pressure is generally between 10.0 and 20.0 MPa and the temperatures between 340 and 420° C.

When the metal content of the feedstock is greater (above 250 ppm) and/or when a significant conversion is desired (transformation of the heavy fraction 370° C.+ or 540° C.+ into a lighter fraction 370° C.− or 540° C.−), hydrotreating and hydroconversion processes in an ebullated bed are preferred. In this type of process (described in particular by M. S. Rana et al., Fuel, 86, 2007, p. 1216), the purification performance qualities are lower than those of the RDS processes but the hydroconversion of the residue fraction is higher and of the order of 45% to 90%. The high temperatures involved, of between 400° C. and 450° C., contribute to this high hydroconversion. Furthermore, as a result of the very high contents of metals and asphaltenes of the feedstock and of the high conversion desired, the effluents formed by this type of process can exhibit stability problems with in particular the formation of sediments, the latter nevertheless being more easily removed from the reactors as a result of the setting in motion of the catalyst.

Conventionally, the hydrotreating or hydroconversion processes consist of at least two stages (or sections, or steps) as described, for example, in the patents FR 2 681 871 or U.S. Pat. No. 4,457,831, each stage being carried out in one or more reactors. The first stage is generally targeted at converting a part of the feedstock and at removing a large part of the metals and asphaltenes by using one or more suitable catalysts which may be called hydrodemetallation catalyst (HDM). The name HDM mainly brings together the operations for removal of vanadium and nickel contained in the entities of resin or asphaltene type, and to a lesser extent of iron. The second stage consists in passing the product from the first stage over one or more catalysts which are more active in terms of hydrogenation of the feedstock but less tolerant to metals and asphaltenes, in order to finalize the refining and the conversion of the feedstock.

For the first hydrodemetallation stage, the catalyst must be capable of treating feedstocks rich in metals and in asphaltenes, while having a high demetallizing power combined with a high metal retention capacity, a high resistance to coking and high hydrogenating power for the radicals resulting from the cracking of the feedstock, these radicals being known to be precursors of sediments. Catalysts exhibiting a pore distribution allowing the reactants, in particular the asphaltenes, to diffuse more easily within the porosity and thus to achieve good performance qualities in hydrodemetallation and in rate of conversion of the asphaltenes are described, for example, in the patent U.S. Pat. No. 5,221,656. The advantage of such a pore distribution is also highlighted in the patents U.S. Pat. Nos. 5,089,463 and 7,119,045. The initial active phase of the catalyst placed in the hydrodemetallation stage generally consists of nickel and molybdenum with contents as $MoO_3$ equivalent of the order of 2% to 10% by weight.

For the second stage, the catalyst must exhibit a high hydrogenolyzing potential so as to carry out a deep refining of the products: desulfurization, continuation of the demetallation, lowering of the Conradson carbon and of the content of asphaltenes, minimizing the formation of sediments. Such a catalyst is characterized by a low macropore volume. Furthermore, the patent U.S. Pat. No. 4,818,743 teaches that the pore distribution can be monopopulated between 1 and 13 nm or bipopulated with a relative difference between the two populations which can vary from 1 to 20 nm, as in the patent U.S. Pat. No. 6,589,908. The initial active phase of the catalyst placed in the second stage can consist of cobalt and molybdenum, as is described in the patent U.S. Pat. No. 6,332,976, with contents as $MoO_3$ equivalent of the order of 10% to 17% by weight.

The conventional process for the preparation of a catalyst for the hydrotreating or hydroconversion of residues involves a sequence of many unit stages (H. Toulhoat and P. Raybaud, *Catalysis By Transition Metal Sulphides*, page 137, IFP Energies Nouvelles Publications, Editions Technip, and T. Ertl et al., J (1999) *Preparation of Solids Catalysts*, Wiley-VCH, Weinheim). The first stage consists of the preparation of the support, which is generally γ-alumina obtained by shaping and heat treatment under air of a hydrated alumina precursor of boehmite or pseudoboehmite type. The most widely used shaping technique is the kneading-extrusion technique. This technique comprises a kneading during which the precursor is transformed into a cohesive paste and then it undergoes an extrusion (piston extrusion, for example) through a die which will determine the shape and the size of the grains. The wet grains subsequently pass through a drying stage in order to evaporate a part of the water which they contain. These are subsequently calcined at a temperature generally of greater than 500° C., which makes it possible to form the γ-alumina phase and to stabilize the pore texture of the support, which will no longer change even under the operating conditions of the process. The following stage is a stage of impregnation, generally by dry impregnation, of the alumina with an aqueous solution containing the precursors of the active phase (transition metals from Group VI and Group VIII), followed by an optional stage of maturing under a water-saturated atmosphere in order to finalize the diffusion of the metal precursors into the porosity of the support. The impregnated support subsequently generally undergoes a drying stage and a calcination stage with the aim of decomposing the metal precursors to give oxides. The active phase is finally formed during a sulfidation stage, transforming the oxides into metal sulfides.

Even if this conventional process generally results in hydrotreating or hydroconversion catalysts exhibiting satisfactory performance qualities, it nevertheless exhibits the disadvantage of being an expensive process since it employs a sequence of multiple unit stages.

In order to optimize the costs of manufacture of the catalysts, it is known to a person skilled in the art that it is possible to prepare hydrotreating or hydroconversion catalysts by cokneading the support with the precursors of the active phase, thus economizing at least on the impregnation stage, such as, for example, in the patent US 2005/0109674 or U.S. Pat. No. 4,717,706, where the catalyst is prepared by cokneading a phosphorus-doped boehmite cake with metallic precursors of the active phase.

Thus, the patent U.S. Pat. No. 4,097,413 describes a catalyst having contents of between 22% and 28% of molybdenum oxide (in the form of molybdenum trioxide) and between 6% and 10% of cobalt oxide, with respect to the total weight of the catalyst, and a specific surface of between 220 and 280 m$^2$/g, prepared by cokneading boehmite with the precursors of the active phase, the product obtained after cokneading being partially dried in order to adjust its water content in order to be able to obtain an extrudable paste. Once the extrusion has been carried out, the catalyst is obtained by calcination at a temperature of between 482 and 677° C. Although this process is optimized since it economizes on the impregnation stage but also on a calcination stage (that employed in the conventional process to carry out the transition from boehmite to alumina before impregnation of the support with the precursor metals of the active phase), the main disadvantage of the preparation process described in the patent U.S. Pat. No. 4,097,413 is that it employs an unstabilized alumina precursor (boehmite) which is very reactive with the often acidic solutions containing the precursors of the active phase. This has the consequence of degrading the pore texture of the support, which is generally manifested by losses in pore volume and the creation of microporosity harmful to the good diffusion of the heavy products which can be found in an atmospheric residue or a vacuum residue. Furthermore, the strong chemical interaction between the aluminous sites of the boehmite and the precursors of the metals present in solution generates an active phase which is weakly dispersed and not very available because it is found trapped in the very structure of the support.

To get around this problem, the prior art describes many processes for cokneading alumina (i.e., a stabilized support) with the precursors of the active phase, such as the patents US2010/0243526, US2015/0111726, US2013/0105364 and US2013/0284640. These processes are certainly more integrated than the conventional process because they make it possible to economize on an impregnation stage but, with two calcination stages (calcination of the boehmite to form the alumina and calcination after bringing the alumina into contact with the metals), they remain less integrated than the boehmite cokneading process which does not provide the intermediate boehmite-to-alumina calcination.

The patent FR 3 022 156 describes a residue hydrodemetallation catalyst obtained according to an alumina cokneading process. The first stage consists in synthesizing an alumina precursor gel (boehmite) obtained from sodium aluminate and aluminum sulfate. This boehmite precursor is subsequently dried at a temperature of 120° C. and then calcined at a temperature of 750° C. to obtain the alumina. Mixing is subsequently carried out between the alumina powder and an aqueous solution obtained by dissolution of the precursors of the active phase, such as molybdenum trioxide, nickel hydroxide and phosphoric acid. The paste obtained is subsequently shaped, dried at 80° C. and calcined a second time at 400° C. A final sulfidation stage is essential before the catalyst is used. The catalyst thus obtained exhibits catalytic performance qualities and characteristics similar to those of a catalyst prepared by dry impregnation of alumina, and catalytic performance qualities superior to those of a catalyst prepared by boehmite cokneading. This type of conventional process is multistage and contains in particular two calcination stages.

The conventional process is thus an expensive process because it involves a sequence of numerous unit stages. The alternative processes, economizing on at least one stage, such as the impregnation, are not always conclusive because they can generate losses of pore volumes, the creation of microporosity harmful to the good diffusion of the residues, as a result, for example, of bringing alumina precursors into contact with the acidic solutions containing the metal precursors.

Surprisingly, the applicant company has developed a novel process for the preparation of a catalyst comprising the cokneading of a boehmite with an active phase resulting from an aqueous solution formed of a heteropolyanion salt of Keggin and/or lacunary Keggin and/or substituted lacunary Keggin and/or Anderson and/or Strandberg type, exhibiting, in its structure, molybdenum and cobalt and/or nickel. A main advantage of this method of preparation is that of limiting both the problems of degradation of the pore texture of the support (loss of pore volume in particular) and of poor dispersion of the active phase (loss of hydro-dehydrogenating activity) generally encountered with the cokneading processes, while being more integrated as a result of the reduction in the number of unit stages in the scheme for manufacture of the catalyst, in particular by the suppression of an impregnation stage and the implementation of a single calcination stage.

It is important to emphasize that the catalyst obtained according to the preparation process according to the invention differs structurally from a catalyst obtained by simple impregnation of a precursor on the alumina support in which the alumina forms the support and the active phase is introduced into the pores of this support. The process for the preparation of the catalyst as described in the present invention makes it possible to obtain a material in which the metals and the support are intimately mixed, thus forming the very structure of the catalyst after the final calcination with a porosity and a content of active phase suitable for the desired reactions.

Furthermore, the use of an aqueous solution formed of a salt of heteropolyanions of the Keggin and/or lacunary Keggin and/or substituted lacunary Keggin and/or Anderson and/or Strandberg type, exhibiting, in its structure, molybdenum and cobalt and/or nickel, makes it possible to promote the interaction between the metals and to increase the catalytic activity, in comparison with any other type of aqueous solution in which the metals would be in different structures, in particular in nitrogenous compounds, such as ammonium (poly)molybdate or nickel or cobalt nitrate. Furthermore, the salts of heteropolyanions exhibit high (Co+Ni)/Mo molar ratios, inducing, after sulfidation, optimum Co/Mo and Ni/Mo ratios in the molybdenum disulfide ($MoS_2$) sheets generated, ensuring the promotion of the activity of the molybdenum.

The applicant company has also discovered that the use of said catalyst in various configurations of processes for hydrotreating and/or hydroconversion of residues makes it possible to maintain the rate of conversion of the heavy fraction ($HDC_{320+}$, $HDC_{540+}$) into lighter fractions ($HDC_{320-}$, $HDC_{540-}$), the rate of conversion of asphaltenes ($HDC_7As$), the rate of conversion of "Conradson Carbon Residue" (HDCCR), the rate of hydrodesulfurization (HDS), hydrodemetallation (HDM) and hydrodenitrogenation (HDN) at levels as high as those of a catalyst prepared without a cokneading stage with a stage of dry impregnation of alumina or prepared by cokneading of alumina according to a conventional multistage process.

The catalyst according to the invention allows an improvement in hydrodemetallation and in hydrodeasphalting, while exhibiting a great stability over time, compared with the processes employing a cokneading of boehmite with nitrogenous solutions.

SUBJECT MATTER OF THE INVENTION

A subject matter of the present invention relates to a process for the preparation of a catalyst comprising an active phase comprising molybdenum and nickel and/or cobalt, and an oxide matrix predominantly composed of alumina, said catalyst comprising a total pore volume of at least 0.6 ml/g, a macropore volume of between 10.0% and 40.0% of the total pore volume, a mesopore volume of at least 0.5 ml/g and a mean mesopore diameter of greater than 5.0 nm, comprising the following stages:

a) a stage of preparation of an aqueous solution of aluminum precursors comprising a first aluminum precursor, chosen from aluminum sulfate, aluminum chloride, aluminum nitrate and their mixtures, and a first basic aluminum precursor, chosen from sodium aluminate, potassium aluminate, ammonia, sodium hydroxide, potassium hydroxide and their mixtures;

b) a stage of bringing the solution obtained on conclusion of stage a) into contact with a second basic precursor, chosen from sodium aluminate, potassium aluminate, ammonia, sodium hydroxide, potassium hydroxide and their mixtures, and with a second acidic precursor chosen from aluminum sulfate, aluminum chloride, aluminum nitrate, sulfuric acid, hydrochloric acid, nitric acid and their mixtures, in order to obtain a suspension, with at least one of the second basic or acidic precursors comprising aluminum, the relative flow rate of the second acidic and basic precursors being chosen so as to obtain a pH of the reaction medium of between 7.0 and 10.0 and the flow rate of the second acidic and basic precursor(s) containing aluminum being adjusted so as to obtain a concentration as alumina equivalent in the suspension of between 10.0 and 80.0 g/l, at a temperature of between 20.0 and 90.0° C. and over a time of between 1 and 75 minutes;

c) filtration and washing of the suspension obtained in stage b) in order to obtain a boehmite cake;

d) preparation of a clear aqueous solution at a pH of between 3.5 and 8.0, comprising a salt of heteropolyanion of Keggin and/or lacunary Keggin and/or substituted lacunary Keggin and/or Anderson and/or Strandberg type and their mixtures, said salt exhibiting, in its structure, molybdenum and cobalt and/or nickel;

e) cokneading of the boehmite cake obtained on conclusion of stage c) with the clear aqueous solution obtained on conclusion of stage d) in order to form a paste;

f) shaping of the paste obtained on conclusion of stage e) in order to form grains of catalyst precursor;

g) drying of the grains obtained on conclusion of stage f), at a temperature of less than 250.0° C., in order to obtain dried grains of catalyst precursor;

h) calcination of the dried grains obtained on conclusion of stage g), at a temperature of between 250.0 and 1000.0° C.

Another subject matter of the invention relates to a process for the hydrotreating and/or hydroconversion of a heavy hydrocarbon feedstock containing at least 50.0% by weight of hydrocarbons having a boiling point of greater than 300° C., with respect to the weight of the heavy hydrocarbon feedstock, and at least 1.0% by weight of hydrocarbons having a boiling point of greater than 540° C., with respect to the weight of the heavy hydrocarbon feedstock, in the presence of a catalyst prepared according to said process.

DEFINITIONS AND ABBREVIATIONS

It is specified that, throughout this description, the expressions "of between . . . and . . . " and "comprising between . . . and . . . " must be understood as including the limits mentioned.

The term "clear" aqueous solution is understood to mean an aqueous solution devoid of solid particles in suspension or of precipitate.

The term "grains" is understood to mean the shaped material.

The term "loss on ignition" or LOI is understood to mean the measurement of the amount of volatile matter contained in a solid or pasty sample: it is expressed as % by weight with respect to the initial weight of the sample. It is obtained by placing the sample in a muffle furnace at 1000° C. for 3 h. The LOI is obtained by the difference between the weight of the sample before and after treatment at 1000° C. in the muffle furnace.

The term "macropore volume" or $V_{macro}$ or $V_{50\ nm}$ is understood to mean the volume of the pores with a diameter of greater than 50.0 nm.

The term "mesopore volume" or $V_{meso}$ is understood to mean the volume of the pores with a diameter of greater than 2.0 nm and less than 50.0 nm.

The term "micropore volume" or $V_{micro}$ is understood to mean the volume of the pores with a diameter of less than 2.0 nm.

The terms "total pore volume" or TPV, "mesopore volume" or $V_{meso}$, and "macropore volume" or $V_{macro}$ are understood to mean the volumes determined by the mercury intrusion method. The volumes are measured according to the standard ASTM D4284-83 by the mercury penetration technique, in which the Washburn equation is applied, which equation gives the relationship between the pressure, the diameter of the smallest pore into which the mercury penetrates at said pressure, the wetting angle and the surface tension according to the formula:

$$d = \frac{(4 \cdot t \cdot \cos(\theta)) \cdot 10}{P}$$

in which
"d" represents the diameter of the pore (nm)
t the surface tension (48.5 Pa)
θ the contact angle (θ=140 degrees) and
P the pressure (MPa)

The term "micropore volume" or $V_{micro}$ is understood to mean the volume determined by nitrogen porosimetry. The quantitative analysis of the microporosity is carried out starting from the "t" method (Lippens-De Boer method, 1965), which corresponds to a transform of the starting adsorption isotherm, as described in the work "Adsorption by powders and porous solids. Principles, methodology and applications", written by F. Rouquérol, J. Rouquérol and K. Sing, Academic Press, 1999.

The term "BET surface" is understood to mean the specific surface determined by nitrogen adsorption in accordance with the standard ASTM D 3663-78 drawn up from the Brunauer-Emmett-Teller method described in the periodical The Journal of the American Chemical Society, 60, 309 (1938).

DETAILED DESCRIPTION OF THE INVENTION

Within the meaning of the present invention, the various embodiments presented can be used alone or in combination with one another, without any limit to the combinations.

Process for Preparation of the Catalyst

The present invention relates to a catalyst preparation process comprising the stages of:
a) preparation of an aqueous solution of aluminum precursors;
b) bringing a second acidic precursor and a second basic precursor into contact in the solution obtained on conclusion of stage a) in order to obtain a suspension;
c) filtration and washing of the suspension obtained on conclusion of stage b) in order to obtain a boehmite cake;
d) preparation of an aqueous solution comprising a salt of heteropolyanion of Keggin and/or lacunary Keggin and/or substituted lacunary Keggin and/or Anderson and/or Strandberg type, alone or as a mixture, said salt exhibiting, in its structure, molybdenum and cobalt and/or nickel;
e) cokneading of the boehmite cake obtained on conclusion of stage c) with the solution obtained on conclusion of stage d) in order to obtain a paste;
f) shaping of the paste obtained on conclusion of stage e) in order to form grains of catalyst precursor;
g) drying of the grains obtained on conclusion of stage f);
h) calcination of the dried grains obtained on conclusion of stage g).

Stages a) to h) are described in detail below.

a) Preparation of an Aqueous Solution of Aluminum Precursors

The process according to the invention comprises a stage a) of preparation of an aqueous solution of aluminum precursors comprising a first acidic aluminum precursor and a first basic aluminum precursor, in water.

The first acidic aluminum precursor is used alone or as a mixture and is chosen from aluminum sulfate, aluminum chloride, aluminum nitrate and their mixtures, preferably aluminum sulfate.

The first basic precursor is used alone or as a mixture and is chosen from sodium aluminate, potassium aluminate, ammonia, sodium hydroxide, potassium hydroxide and their mixtures; preferentially, the first basic precursor is chosen from sodium aluminate and potassium aluminate. Preferably, the first basic precursor is sodium aluminate.

According to a first embodiment, the preparation of said aqueous solution comprises two operations:
i) dissolving the first acidic aluminum precursor in water and;
ii) bringing said solution into contact with the first basic aluminum precursor, in order to adjust the pH of said solution.

Dissolution Stage i)

The dissolution of the first acidic aluminum precursor in water is carried out at a temperature of between 20.0 and 60.0° C., preferably between 40.0 and 60.0° C.

The rate of progression of stage i) is between 0.5% and 13%, the rate of progression being defined as the proportion of alumina theoretically formed as equivalent weight $Al_2O_3$ during stage i), with respect to the total amount formed on conclusion of stage b).

The rate of progression is preferably between 0.5% and 4.0% by weight, very preferably between 1.0% and 3.0% by weight.

Preferentially, stage i) is carried out with stirring for a period of time of between 2 and 60 minutes and preferably between 5 and 30 minutes.

The pH of the solution obtained on conclusion of stage i) is between 0.5 and 5.0, preferably between 1 and 4, in a preferred way between 1.5 and 3.5.

Contacting Stage ii)

The operation of bringing said solution, resulting from stage i), into contact with the first basic aluminum precursor is carried out at a temperature of between 60.0 and 90.0° C., preferably between 60.0 and 80.0° C.

Stage ii) lasts between 5 and 30 minutes, preferably between 7 and 25 minutes and very preferably between 8 and 20 minutes.

The pH of the solution obtained on conclusion of stage ii) is between 7.0 and 10.0, preferably between 8.0 and 10.0, in a preferred way between 8.5 and 10.0 and very preferably between 8.7 and 9.9. Advantageously, stage ii) is carried out with stirring.

According to a second embodiment, the preparation of said aqueous solution comprises two operations:
i') bringing the first acidic aluminum precursor and the first basic aluminum precursor into contact in water, and
ii') heating the suspension obtained on conclusion of stage i').

Contacting Stage i')

The operation of bringing the first acidic aluminum precursor and the first basic aluminum precursor into contact in water is carried out at a temperature of between 20.0 and 60.0° C., preferably between 30 and 50° C.

The rate of progression of stage i') is between 0.5% and 13%, the rate of progression being defined as the proportion of alumina theoretically formed as equivalent weight $Al_2O_3$ during stage i'), with respect to the total amount formed on conclusion of stage b).

The rate of progression is preferably between 1.0% and 8.0% by weight, very preferably between 1.0% and 3.0% by weight.

Preferentially, stage i') is carried out with stirring for a period of time of between 2 and 60 minutes and preferably between 5 and 30 minutes.

The pH of the solution obtained on conclusion of stage i') is between 0.5 and 5.0, preferably between 1 and 4, in a preferred way between 8.5 and 10.5, preferably between 9.0 and 10.0.

An aqueous suspension is obtained on conclusion of stage i').

Heating Stage ii')

Stage ii') of heating the aqueous suspension obtained on conclusion of stage i') is carried out so as to reach, at the end of stage ii'), a temperature of between 60.0 and 90.0° C., preferably between 60.0 and 80.0° C.

Stage ii') lasts between 5 and 45 minutes, preferably between 15 and 45 minutes and very preferably between 20 and 40 minutes.

Advantageously, stage ii') is carried out with stirring.

b) Bringing a Second Acidic Precursor and a Second Basic Precursor into Contact

Stage b) is the operation of bringing the solution obtained on conclusion of stage a) into contact with a second acidic precursor and a second basic precursor in an aqueous reaction medium, in order to obtain a suspension. Stage b) corresponds to a coprecipitation stage.

The second basic precursor is used alone or as a mixture and is chosen from sodium aluminate, potassium aluminate, ammonia, sodium hydroxide, potassium hydroxide and their mixtures.

The second acidic precursor is used alone or as a mixture and is chosen from aluminum sulfate, aluminum chloride, aluminum nitrate, sulfuric acid, hydrochloric acid, nitric acid and their mixtures.

At least one of the second basic or acidic precursors comprises aluminum and said second precursors can be identical to or different from the precursors introduced in stage a).

The relative flow rate of the second acidic and basic precursors is chosen so as to obtain a pH of the reaction medium of between 7.0 and 10.0. The flow rate of the second acidic and basic precursor(s) containing aluminum is adjusted so as to obtain a concentration as alumina equivalent in the suspension of between 10.0 and 80.0 g/l, preferentially between 20.0 and 50.0 g/l and more preferentially between 25.0 and 40.0 g/l.

Stage b) is carried out at a temperature of between 20.0 and 90.0° C. and more preferably between 30.0 and 70.0° C.

and at a pH of between 7.0 and 10.0, preferably between 8.0 and 10.0, in a preferred way between 8.5 and 10.0 and very preferably between 8.7 and 9.9.

Stage b) lasts between 1 and 75 minutes, preferentially between 30 and 60 minutes.

According to one embodiment, stage b) is carried out with stirring.

On conclusion of stage b), a suspension is obtained.

c) Filtration and Washing

Stage c) of the process for the preparation of the catalyst comprises the filtration of the suspension obtained on conclusion of stage b). The filtration is carried out according to methods known to a person skilled in the art.

After filtration, the wet solid obtained is washed with an aqueous solution, preferably with water, with an amount of water equal to the amount of filtered solid.

According to one embodiment, stage c) comprises between one and four washing operations. Each washing is followed by a filtration stage.

The wet solid, thus filtered and washed, forms a boehmite cake.

Said cake is the matrix in which the metal precursors of the active phase will be mixed, in stage e). Optionally, stage c) comprises the partial removal of the water contained in the boehmite cake. The removal is carried out at a temperature of less than 50.0° C., in order to obtain a paste. Said removal stage is carried out at a temperature of between 15.0 and 50.0° C., preferably between 15.0 and 45.0° C. and preferentially between 15.0 and 30.0° C. and for a duration of between 5 minutes and 48 hours and preferably between 30 minutes and 40 hours.

The removal of at least a part of the water is carried out according to methods known to a person skilled in the art, such as, for example, in a closed and ventilated oven, in a tunnel or belt dryer, by high vacuum or pressure filtration, by centrifugation, by infrared drying, by microwave drying or in a heating mixer.

The partial removal of the water can make it possible to decrease the loss on ignition (LOI) of the boehmite cake having a value of between 70.0% and 95.0% by weight down to a value of between 55.0% and 70.0% by weight and preferably down to a value of between 58.0% and 68.0% by weight.

d) Preparation of a Clear Aqueous Solution

The process according to the invention comprises a stage d) of preparation of a clear aqueous solution comprising a heteropolyanion salt used alone or as a mixture and chosen from salts of heteropolyanion of Keggin, lacunary Keggin, substituted lacunary Keggin, Anderson or Strandberg type and their mixtures, said salt exhibiting, in its structure, molybdenum and cobalt and/or nickel.

The aqueous solution(s) comprising a salt of heteropolyanion, exhibiting, in its structure, molybdenum and cobalt and/or nickel, precursors of the active phase.

The heteropolyanion salt is chosen from the list consisting of:
heteropolyanions of Keggin, lacunary Keggin or substituted lacunary Keggin type, according to the formula (I):

$$C_p X_{x/2} A_g Mo_m W_n X'_z O_y H_h \qquad (I)$$

where:
C is the $H^+$ cation and/or a substituted or unsubstituted quaternary ammonium cation (e.g. $N(R_1R_2R_3R_4)^+$ in which $R_1$, $R_2$, $R_3$ and $R_4$ are identical or different, linear, branched, cyclic or cyclic and branched, and correspond to a hydrogen atom or an alkyl group comprising from 1 to 5 carbon atoms),
p is an integer between 0 and 6; preferably, p is an integer between 0 and 2, such as 0 or 1,
X is the $Ni^{2+}$ cation or the $Co^{2+}$ cation,
x is an integer between 0 and 11; preferably, x is an integer between 3 and 8,
p+x is an integer between 3 and 11; preferably, p+x is an integer between 3 and 8,
A is phosphorus or silicon or boron; preferably, A is phosphorus or silicon,
g is 0 or 1; preferably, g is 1,
Mo is molybdenum,
W is tungsten,
m is an integer between 1 and 12; preferably, m is an integer between 9 and 12,
n is an integer between 0 and 11; preferably, n is an integer between 0 and 3,
m+n=9 or 11 or 12; preferably, m+n=11 or 12,
X' is an element from Group VIII of the Periodic Table; preferably, X' is nickel or cobalt,
z is 0 or 1,
x+z is an integer greater than or equal to 1,
O is oxygen,
y is an integer equal to 34 or 39 or 40; preferably, y is an integer equal to 39 or 40,
H is hydrogen,
h is an integer between 0 and 3; preferably, h is an integer between 0 and 2, and
the structure $A_gMo_mW_nX'_zO_yH_h$ is the negatively charged heteropolyanion, its charge being equal to $-(p+x)$;
heteropolyanions of Anderson type, of formula (II):

$$A_aMo_mW_nO_yH_hM_{x/2} \quad (II)$$

where:
A is nickel or cobalt,
a is 1 or 2,
Mo is molybdenum,
W is tungsten,
m is an integer between 1 and 10; preferably, m is an integer between 6 and 10,
n is an integer between 0 and 9; preferably, n is an integer between 0 and 4,
m+n is 6 or 10,
O is oxygen,
y is 24 or 38,
H is hydrogen,
h is 4 or 6,
the structure $A_aMo_mW_nO_yH_h$ is the negatively charged heteropolyanion, its charge being equal to $-x$,
M is a cation of one of the elements from Group VIII of the Periodic Table; preferably, M is the $Ni^{2+}$ cation or the $Co^{2+}$ cation, and
x is an integer between 3 and 8; preferably, x is an integer between 4 and 8,
heteropolyanions of Strandberg type, of formula (III):

$$M_{(6-h)/2}H_hP_2Mo_mW_nO_{23} \quad (III)$$

where:
M is the $Ni^{2+}$ cation or the $Co^{2+}$ cation,
H is hydrogen,
h is an integer between 0 and 2,
P is phosphorus,
Mo is molybdenum,
W is tungsten,
m is an integer between 1 and 5; preferably, m is an integer between 3 and 5, n is an integer between 0 and 4; preferably, n is an integer between 0 and 2,
m+n=5,
O is oxygen,
the structure $H_hP_2Mo_mW_nO_{23}$ is the negatively charged heteropolyanion, its charge being equal to h−6.

Preferably, the heteropolyanion salt is chosen from heteropolyanions of Anderson type, of formula (II).

According to one or more preferred embodiments, the preparation of a heteropolyanion salt comprises the stages α, β, γ, and δ described below:
α/ dissolution of a molybdenum precursor, and optionally of a tungsten precursor, with an oxoacid compound and/or an oxidizing agent and/or a base, in water;
β/ addition of a nickel and/or cobalt precursor to the solution obtained on conclusion of stage α/;
γ/ optionally removal, preferably by filtration, of the solid formed on conclusion of stage β/ in order to obtain a clear aqueous solution comprising a heteropolyanion salt;
δ/ optionally, the pH of the aqueous solution is adjusted, by addition of an organic base, to a value of between 3.5 and 8.0.

Stage α

According to one or more embodiments, said dissolution stage a lasts between 2 minutes and 24 hours, at ambient temperature or at reflux, that is to say at a temperature of between 10.0 and 100.0° C., preferably between 50.0 and 90.0° C., until an aqueous solution is obtained.

The molybdenum precursor used in stage α/ is chosen from molybdenum oxides, such as molybdenum trioxide, molybdenum hydroxides, molybdic acids, phosphomolybdic acids, silicomolybdic acids or boromolybdic acids, alone or as a mixture.

Optionally, the tungsten precursor used in stage α/ is chosen from tungsten oxides, tungsten hydroxides, tungstic acids, phosphotungstic acids, silicotungstic acids or borotungstic acids, alone or as a mixture.

Optionally, the oxoacid compound used in stage α/ is chosen from silicic acids (e.g., orthosilicic, metasilicic, pyrosilicic acid), phosphoric acids (e.g., orthophosphoric acid) and boric acids, alone or as a mixture.

Optionally, the oxidizing agent used in stage α/ is chosen from hydrogen peroxide $H_2O_2$ and alkyl hydroperoxides (R—OOH), in particular tert-butyl hydroperoxide (t-Bu-OOH).

Optionally, the base used in stage α/ exhibits a pKa of greater than or equal to 12, preferably of greater than or equal to 14.

Preferentially, the base is chosen from barium hydroxide $Ba(OH)_2$, lithium hydroxide LiOH, sodium hydroxide NaOH or potassium hydroxide KOH. Preferably, the base is barium hydroxide $Ba(OH)_2$.

According to one or more embodiments, the oxoacid/(Mo+W) molar ratio is between 0.01 and 10.0, preferably between 0.05 and 1.5, particularly preferably between 0.09 and 1.0.

According to one or more embodiments, the W/Mo molar ratio is between 0 and 25.0, preferentially between 0 and 11.0 and preferably between 0 and 1.0.

According to one or more embodiments, the oxidizing agent/(Mo+W) ratio is between 0.1 and 20.0, preferably between 0.5 and 10.0, particularly preferably between 2.0 and 7.0.

According to one or more embodiments, the (base)/Mo molar ratio is between 0.01 and 10.0, preferably between 0.05 and 2.0, such as between 0.1 and 1.0.

Stage β

According to one or more embodiments, stage β/ lasts between 2 minutes and 24 hours, at ambient temperature or at reflux, that is to say at a temperature of between 10.0 and 100.0° C., preferably at a temperature of between 20.0 and 90.0° C., until an aqueous solution is obtained.

According to one embodiment, the aqueous solution comprises a precipitate.

According to one or more embodiments, the nickel and/or cobalt precursor is chosen, alone or as a mixture, from oxides, hydroxides, hydroxycarbonates, carbonates or sulfates of a metal from Group VIII, for example nickel hydroxycarbonate, cobalt carbonate, nickel hydroxide or cobalt hydroxide.

The (metals from Group VIII)/(Mo+W) molar ratio is between 0.05 and 5.0, preferably between 0.1 and 1.5, particularly preferably between 0.2 and 0.7. Preferably, this molar ratio is adjusted according to the type of feedstock and the process used.

According to one or more embodiments, stages α/ and β/ are carried out successively or simultaneously.

Preferably, stages α/ and β/ are combined in one and the same stage. The molybdenum precursor, optionally the tungsten precursor and/or the oxoacid compound and/or the oxidizing agent and/or the base, and the nickel and/or cobalt precursor, are dissolved simultaneously in water, for 2 minutes to 24 hours, at ambient temperature or at reflux, that is to say at a temperature of between 10.0 and 100.0° C., preferably at a temperature of between 20.0 and 90.0° C., until an aqueous solution is obtained.

According to one embodiment, the aqueous solution comprises a precipitate.

Stage γ

According to one or more embodiments, said filtration stage γ/ is carried out when the addition of the nickel and/or cobalt precursor during stage β/ leads to the formation of a precipitate.

On conclusion of stage γ/, a clear aqueous solution is obtained comprising a heteropolyanion salt, alone or as a mixture.

Any method known to a person skilled in the art, such as filtration or centrifugation, is employed in order to carry out the separation making possible the removal of the precipitate.

Stage δ

According to one or more embodiments, said stage δ/ lasts between 2 minutes and 24 hours and is carried out at a temperature of between 5.0 and 50.0° C., preferably at a temperature of between 10.0° C. and 30.0° C.

The organic base is chosen from ammonia, tertiary amines, urea or methenamine, alone or as a mixture, and preferably the organic base is ammonia.

The organic base is added to the solution resulting from stage β/ or γ/, in proportions allowing the pH of the solution to be adjusted to a value of between 3.5 and 8.0, preferably between 3.5 and 7.5, particularly preferably between 3.5 and 7.0.

Advantageously, stage δ/ is carried out when the pH of the solution resulting from stage β/ or 9γ/ is less than 3.5.

According to one or more preferred embodiments, the aqueous solution comprising a heteropolyanion salt, alone or as a mixture, is prepared:

(j) by dissolution in water of at least one HPA salt;
(jj) by direct preparation of the heteropolyanion salt in an aqueous solution, comprising carrying out stages α/, β/ and optionally γ/ and/or δ/.

Preferably, the heteropolyanion salt solution is prepared by direct preparation of the heteropolyanion salt in an aqueous solution according to the second implementation (jj).

The heteropolyanion salt can advantageously be prepared by any method well known to a person skilled in the art or else can be acquired from companies which are specialists in heteropolyanion salt manufacture and sale.

According to one or more embodiments, the heteropolyanion salt, used alone or as a mixture, in stage d) of the process for the preparation of the catalyst, is chosen from the following heteropolyanions: $Ni_{3/2}PMo_{12}O_{40}$, $Ni_2SiMo_{12}O_{40}$, $Ni_3Mo_{12}O_{40}H_2$, $Ni_4SiMo_{11}O_{39}$, $Ni_{7/2}PMo_{11}O_{39}$, $Ni_3SiMo_{11}NiO_{40}H_2$, $Ni_3PMo_{11}NiO_{40}H$, $Co_{3/2}PMo_{12}O_{40}$, $Co_2SiMo_{12}O_{40}$, $Co_3Mo_{12}O_{40}H_2$, $Co_4SiMo_{11}O_{39}$, $Co_{7/2}PMo_{11}O_{39}$, $Co_3SiMo_{11}CoO_{40}H_2$, $Co_3SiMo_{11}NiO_{40}H_2$, $Ni_3SiMo_{11}CoO_{40}H_2$, $Co_3PMo_{11}CoO_{40}H$, $Co_3PMo_{11}NiO_{40}H$, $Ni_3PMo_{11}CoO_{40}H$ observing the formula (I), $CoMo_6O_{24}H_6Co_{3/2}$, $CoMo_6O_{24}H_6Ni_{3/2}$, $CoMo_6O_{24}H_6Co_2$, $CoMo_6O_{24}H_6Ni_2$, $NiMo_6O_{24}H_6Ni_2$, $NiMo_6O_{24}H_6Co_2$, $Co_2Mo_{10}O_{38}H_4CO_3$, $Co_2Mo_{10}O_{38}H_4Ni_3$, $Ni_2Mo_{10}O_{38}H_4Co_4$, $Ni_2Mo_{10}O_{38}H_4Ni_4$ observing the formula (II), $Co_2H_2P_2Mo_5O_{23}$, $Co_{5/2}HP_2Mo_5O_{23}$, $Co_3P_2Mo_5O_{23}$, $Ni_2H_2P_2Mo_5O_{23}$, $Ni_{5/2}HP_2Mo_5O_{23}$, $Ni_3P_2Mo_5O_{23}$ observing the formula (III).

Preferably, according to one or more embodiments, the heteropolyanion salt is chosen from the following salts: $Ni_4SiMo_{11}O_{39}$, $Ni_3SiMo_{11}NiO_{40}H_2$, $Co_4SiMo_{11}O_{39}$, $Co_3SiMo_{11}CoO_{40}H_2$, $Co_3SiMo_{11}NiO_{40}H_2$, $Ni_3SiMo_{11}CoO_{40}H_2$, observing the formula (I), $CoMo_6O_{24}H_6Co_2$, $NiMo_6O_{24}H_6Ni_2$, $CO_2Mo_{10}O_{38}H_4CO_3$, $Ni_2Mo_{10}O_{38}H_4Ni_4$ observing the formula (II), $Co_{5/2}HP_2Mo_5O_{23}$, $Co_3P_2Mo_5O_{23}$, $Ni_{5/2}HP_2Mo_5O_{23}$, $Ni_3P_2Mo_5O_{23}$ observing the formula (III).

Very preferably, according to one or more embodiments, the heteropolyanion salt according to the present description is chosen from the following salts: $Ni_4SiMo_{11}O_{39}$, $Ni_3SiMo_{11}NiO_{40}H_2$, observing the formula (I), $NiMo_6O_{24}H_6Ni_2$, $Ni_2Mo_{10}O_{38}H_4Ni_4$ observing the formula (II), $Ni_{5/2}HP_2Mo_5O_{23}$, $N_{13}P_2Mo_5O_{23}$ observing the formula (III).

The empirical formula(e) given above refer to the overall composition of the solution, but do not prejudge the exact form of the molecular structure(s) present in the final solution.

Preferentially, the aqueous solution obtained on conclusion of stage d) does not comprise nitrogenous compounds, such as ammonium salts or nitrate salts. This is because nitrate ions have a negative effect on the dispersion of the metals and the activity of the final catalyst obtained on conclusion of the preparation process according to the present invention.

Optionally, the aqueous solution obtained on conclusion of stage d) can undergo a dilution stage or an evaporation stage, in order to modify the water content of said solution as a function of the targeted content of metals of the final catalyst. The dilution or the evaporation are carried out by any means known to a person skilled in the art.

The solution obtained on conclusion of stage d) has a pH of between 3.5 and 8.0, preferably between 3.5 and 7.5, particularly preferably between 3.5 and 7.0, making it possible to obtain a catalyst in which the metals and the support are intimately mixed with a porosity and an active phase content which are suitable for the desired reactions.

In accordance with the invention, if the aqueous solution obtained on conclusion of stage d) contains only one or more heteropolyanion salt(s) observing the formula (II), the pH of said solution is between 3.5 and 8.0, preferably between 3.5 and 5.8, particularly preferably between 3.5 and 5.5.

In accordance with the invention, if the aqueous solution obtained on conclusion of stage d) contains only one or more heteropolyanion salt(s) observing the formula (I) and/or the formula (III), the pH of said solution is between 3.5 and 8.0, preferably between 3.8 and 7.5, particularly preferably between 4.0 and 7.0.

According to one or more embodiments, the aqueous solution obtained on conclusion of stage d) exhibits a molybdenum molar concentration of between 0.5 and 5.0 mol/l, preferably between 0.8 and 4.5, particularly preferably between 1.0 and 4.0 mol/l.

e) Cokneading of the Cake with the Aqueous Solution

The process according to the invention comprises a stage e) of cokneading of the boehmite cake obtained on conclusion of stage c) and the clear aqueous solution obtained on conclusion of stage d), in order to form a paste. The cokneading is carried out according to means known to a person skilled in the art, such as, for example, in a mixer.

Optionally, deionized water and/or an inorganic or organic additive are added to the mixture of the cake and of the aqueous solution, with the aim of facilitating the kneading or the extrusion and of improving the mechanical properties of the material. The inorganic or organic additive is chosen from polyethylene glycols, monocarboxylic acids, polyvinyl alcohol, methylcellulose, cellulose derivatives, derivatives of hydroxyethylated cellulose type, clays, titanium, iron or aluminum oxides, and their mixtures.

The duration of the cokneading is less than 20 minutes, preferably less than 10 minutes and in a preferred way less than 5 minutes. The kneading speed is between 20 and 50 rpm.

The LOI of the paste at this stage is between 55.0% and 75.0% and preferentially between 60.0% and 70.0%.

f) Shaping of the Paste

The process according to the invention comprises a stage f) of shaping the paste obtained on conclusion of stage e), in order to form grains of catalyst precursor. The shaping is carried out according to any technique known to a person skilled in the art, for example by extrusion, by pelleting, by the oil drop method or by rotating plate granulation. Preferably, the shaping is carried out by extrusion.

The diameter of the grains obtained after the shaping have a diameter of between 0.3 and 10.0 mm, preferably between 0.5 and 3.2 mm and more preferentially between 0.7 and 2.5 mm.

In a preferred embodiment, the grains obtained after shaping are cylindrical, trilobal or quadrilobal grains with a diameter of between 0.7 and 2.5 mm.

According to a preferred embodiment, the cokneading stage e) and the shaping stage f) are combined in a single cokneading-shaping stage, preferably by cokneading-extrusion.

g) Drying of the Paste

The process according to the invention comprises a stage g) of drying the grains obtained on conclusion of stage f), in order to obtain dried grains of precursor of the catalyst. The drying is carried out at a temperature of less than 250.0° C., preferably of between 50.0 and 250.0° C., preferably of between 70.0 and 180.0° C. and more preferentially still of between 100.0 and 130.0° C., according to any technique known to a person skilled in the art, advantageously for a period of time of between 1 and 24 hours. Preferably, the drying is carried out in a closed and ventilated oven.

h) Calcination

The process according to the invention comprises a stage h) of calcination of the dried grains obtained on conclusion of stage g). The calcination is carried out at a temperature of between 250.0 and 1000.0° C., preferably between 300.0 and 800.0° C. and more preferably still between 350.0 and 550.0° C., advantageously for a period of time of between 1 and 10 hours, in the presence of a stream of dry air or of a stream of air containing up to 90% by volume of water.

According to one embodiment, the stream of air containing up to 90% by volume of water is added at atmospheric pressure (steaming) or at autogenous pressure (autoclaving). In the case of steaming, the water content is preferably between 150.0 and 900.0 grams per kilogram of dry air and more preferably still between 250.0 and 650.0 grams per kilogram of dry air.

According to one embodiment, the drying stage g) and the calcination stage h) can be carried out in one and the same heat treatment stage and, according to a particular embodiment, several combined cycles of heat treatments can be carried out.

The catalyst obtained on conclusion of stage h) comprises an active phase comprising molybdenum, cobalt and/or nickel, as well as an oxide matrix predominantly composed of alumina.

Advantageously, the catalyst obtained on conclusion of stage h) undergoes a sulfidation stage before its use. This stage consists in activating the catalyst by transforming, at least in part, the oxide phase in a sulfo-reducing medium. This activation treatment by sulfidation is well known to a person skilled in the art and can be carried out in situ or ex situ by any method already described in the literature.

A conventional sulfidation method well known to a person skilled in the art consists in heating the catalyst under a stream of a mixture of hydrogen and of hydrogen sulfide or under a stream of a mixture of hydrogen and of hydrocarbons containing sulfur-comprising molecules, at a temperature of between 150.0 and 800.0° C., preferably between 250.0 and 600.0° C.

The sulfidation treatment can be carried out ex situ (before the introduction of the catalyst into the hydrotreating/hydroconversion reactor) or in situ by means of an $H_2S$-precursor organosulfur agent injected with the heavy hydrocarbon feedstock to be treated. The $H_2S$ can also originate, for example, from the $H_2S$ contained in the hydrogen recycled to the hydrotreating and/or hydroconversion reactor or from the thermal decomposition of organosulfur molecules present in or introduced beforehand (injection of dimethyl disulfide, any sulfur-comprising hydrocarbon feedstock of the mercaptans, sulfides, sulfur-comprising gasoline, sulfur-comprising gas oil, sulfur-comprising vacuum distillate or sulfur-comprising residue type) into the feedstock.

The Catalyst

The catalyst prepared according to said process comprises an active phase comprising molybdenum and nickel and/or cobalt, and an oxide matrix predominantly composed of alumina, with a total pore volume of at least 0.6 ml/g, a macropore volume of between 10.0% and 40.0% of the total pore volume, a mesopore volume of at least 0.5 ml/g and a mean mesopore diameter of greater than 5.0 nm.

The catalyst of the process according to the invention exhibits a total pore volume (TPV) of at least 0.6 ml/g and preferably of at least 0.7 ml/g. In a preferred embodiment, the catalyst exhibits a total pore volume of between 0.7 and 1.1 ml/g.

The catalyst of the process according to the invention exhibits a macropore volume of between 10.0% and 40.0% of the total pore volume, preferably between 15.0% and 35.0% of the total pore volume and more preferentially still between 20.0% and 30.0% of the total pore volume.

The mesopore volume ($V_{meso}$) of the catalyst, the mesopore volume is at least 0.50 ml/g, preferably at eso, least 0.55 ml/g and preferentially between 0.55 ml/g and 0.80 ml/g.

The diameter at $V_{meso}/2$ (mean mesopore diameter) is greater than 5.0 nm, advantageously between 5.0 nm and 30.0 nm, preferably between 7.0 and 25.0 nm and preferentially between 7.0 and 20.0 nm. The catalyst advantageously exhibits a mean macropore diameter (or diameter at $V_{macro}/2$) of between 250.0 and 1500.0 nm, preferably of between 500.0 and 1000.0 nm and more preferably still of between 600.0 and 800.0 nm.

The catalyst advantageously exhibits a BET specific surface of at least 100.0 m²/g, preferably of at least 120.0 m²/g and more preferably still of between 150.0 and 250.0 m²/g.

The catalyst advantageously exhibits a micropore volume of less than 0.05 ml/g, preferentially of less than 0.03 ml/g, more preferentially of less than 0.02 ml/g, and more preferentially still the micropore volume is less than 0.01 ml/g. Preferably, the catalyst does not exhibit micropores.

The catalyst obtained on conclusion of stage h) has a molybdenum content advantageously of between 2.0% and 18.0% by weight of molybdenum trioxide, with respect to the total weight of the catalyst, preferably between 3.0% and 14.0% and more preferably still between 4.0% and 10.0% by weight.

According to one embodiment, the catalyst obtained on conclusion of stage h) has a tungsten content advantageously of between 2.0% and 18.0% by weight of tungsten trioxide, with respect to the total weight of the catalyst, preferably between 3.0% and 14.0% and more preferably still between 4.0% and 10.0% by weight.

The content of cobalt and/or nickel metal is advantageously between 0.25% and 5.0% by weight of cobalt and/or nickel oxide, with respect to the total weight of the catalyst, preferably between 0.4% and 4.0% and more preferably still between 0.7% and 3.0% by weight.

The content of silicon (or phosphorus or boron) element is advantageously between 0.1% and 8.0% by weight of silicon oxide or of phosphorus oxide or of boron oxide, with respect to the total weight of the catalyst, preferably between 0.4% and 6.0% and more preferably still between 0.6% and 4.0% by weight.

Use of the Catalyst Obtained According to the Preparation Process

The catalyst according to the invention can be employed, with one or more other catalysts known to a person skilled in the art, in hydrotreating processes, in a fixed bed, for example, or hydroconversion processes, in an ebullated bed, for example, making it possible to convert heavy hydrocarbon feedstocks comprising sulfur-comprising impurities and impurities, particularly metals. Its introduction makes it possible to maintain, indeed even to enhance, the hydrotreating and/or hydroconversion of the heavy feedstock compared with the use of any other catalyst known to a person skilled in the art prepared according to a conventional process.

The Heavy Hydrocarbon Feedstocks

The heavy hydrocarbon feedstocks are hydrocarbon feedstocks which contain at least 50.0% by weight, preferably at least 65.0% by weight, particularly preferably at least 80.0% by weight, of hydrocarbons having a boiling point of greater than 300° C., with respect to the weight of the heavy hydrocarbon feedstock, and at least 1.0% by weight of hydrocarbons having a boiling point of greater than 540° C., with respect to the weight of the heavy hydrocarbon feedstock.

The heavy hydrocarbon feedstocks contain sulfur at a content of greater than 0.1% by weight, metals at a content of greater than 20.0 ppm by weight and $C_7$ asphaltenes at a content of greater than 1.0% by weight, such as heavy petroleum feedstocks (called residues) and/or hydrocarbon fractions produced in a refinery. The heavy petroleum feedstocks include atmospheric residues, vacuum residues (e.g. atmospheric or vacuum residues resulting from hydrotreating, hydrocracking and/or hydroconversion stages), fresh or refined vacuum distillates, cuts originating from a cracking unit (e.g. a fluid catalytic cracking (FCC) unit), coking unit or visbrea king unit, aromatic cuts extracted from a unit for the production of lubricants, deasphalted oils resulting from a deasphalting unit, asphalts resulting from a deasphalting unit, or a combination of these feedstocks. The heavy hydrocarbon feedstock can additionally contain a residual fraction resulting from direct coal liquefaction (an atmospheric residue and/or a vacuum residue resulting, for example, from the H-Coal™ process), a vacuum distillate resulting from direct coal liquefaction, such as, for example, the H-Coal™ process, or else a residual fraction resulting from the direct liquefaction of lignocellulose biomass alone or as a mixture with coal and/or a fresh and/or refined petroleum fraction.

According to one or more embodiments, the heavy petroleum feedstocks consist of hydrocarbon fractions resulting from a crude oil or from the atmospheric distillation of a crude oil or from the vacuum distillation of a crude oil, said feedstocks containing a fraction of at least 50.0% by weight, preferably at least 65.0% by weight, particularly preferably at least 80.0% by weight, with respect to the weight of the feedstock, having a boiling point of at least 300.0° C., preferably of at least 350.0° C. and in a preferred way of at least 375.0° C., and preferably vacuum residues having a boiling point of at least 450.0° C., preferably of at least 500.0° C. and in a preferred way of at least 540.0° C.

The heavy hydrocarbon feedstocks treated by the process according to the present description can contain impurities, such as metals, sulfur, resins, nitrogen, Conradson carbon residue and heptane insolubles, also called $C_7$ asphaltenes. According to one or more embodiments, the heavy hydrocarbon feedstock comprises a content of metals of greater than 50.0 ppm by weight, and/or a content of sulfur of greater than 0.1% by weight, and/or a content of $C_7$ asphaltenes of greater than 1.0% by weight, and/or a content of Conradson carbon of greater than 3.0% by weight (e.g. greater than 5.0% by weight), with respect to the total weight of the heavy hydrocarbon feedstock. $C_7$ asphaltenes are compounds known for inhibiting the conversion of residual cuts, both by their ability to form heavy hydrocarbon residues, commonly called coke, and by their tendency to produce sediments which greatly limit the operability of the hydrotreating and hydroconversion units. The Conradson carbon content is defined by the standard ASTM D 482 and represents, for a person skilled in the art, a well-known evaluation of the amount of carbon residues produced after a pyrolysis under standard temperature and pressure conditions.

Hydrotreating Process

In accordance with the invention, the catalyst having a cokneaded active phase is advantageously used in the first catalytic beds of a process successively comprising at least one hydrodemetallation stage and at least one hydrodesulfurization stage. The process according to the invention is advantageously implemented in one to ten successive reactors, it advantageously being possible for the catalyst(s) according to the invention to be charged to one or more reactors and/or to all or part of the reactors. In a preferred embodiment, permutable reactors, that is to say reactors operating in alternation, in which hydrodemetallation catalysts according to the invention can preferably be employed, can be used upstream of the unit. In this preferred embodiment, the permutable reactors are subsequently followed by reactors in series, in which hydrodesulfurization catalysts are employed, which catalysts can be prepared according to any method known to a person skilled in the art.

In a very preferred embodiment, two permutable reactors are used upstream of the unit, advantageously for the hydrodemetallation and containing one or more catalysts according to the invention. They are advantageously followed by one to four reactors in series, advantageously used for the hydrodesulfurization.

The process according to the invention can advantageously be carried out in a fixed bed with the objective of removing the metals and the sulfur and of lowering the mean boiling point of the hydrocarbons. In the case where the process according to the invention is carried out in a fixed bed, the processing temperature is advantageously between 320.0° C. and 450.0° C., preferably 350.0° C. to 410.0° C., under a hydrogen partial pressure advantageously of between 3.0 MPa and 30.0 MPa, preferably between 10.0 and 20.0 MPa, at an hourly space velocity of the feedstock, with respect to the volume of each catalyst, is of between 0.06 $h^{-1}$ and 17.00 $h^{-1}$, preferably between 0.12 $h^{-1}$ and 3.00 $h^{-1}$ and in a preferred way between 0.12 $h^{-1}$ and 1.60 $h^{-1}$. According to one or more embodiments, the amount of hydrogen mixed with the heavy hydrocarbon feedstock is preferably between 50.0 and 5000.0 standard cubic meters ($Sm^3$) per cubic meter ($m^3$) of liquid heavy hydrocarbon feedstock, such as between 100.0 and 3000.0 $Sm^3/m^3$ and preferably between 200.0 and 2000.0 $Sm^3/m^3$.

Hydroconversion Process

According to one or more embodiments, the hydroconversion stage is carried out by means of one or more three-phase reactors, which can be in series and/or in parallel. For example, each hydroconversion reactor can be a reactor of fixed bed, moving bed or ebullated bed type depending on the heavy hydrocarbon feedstock to be treated. In the hydroconversion stage, said heavy hydrocarbon feedstock is generally transformed under conventional conditions for the hydroconversion of a liquid hydrocarbon fraction.

According to one or more embodiments, the hydroconversion stage is carried out under an absolute pressure of between 2.0 and 38.0 MPa, preferably between 5.0 and 25.0 MPa and in a preferred way between 6.0 and 20.0 MPa, and/or at a temperature of between 300.0 and 500.0° C. and preferably of between 350.0 and 450.0° C.

According to one or more embodiments, the hourly space velocity (rHSV) of the feedstock, with respect to the volume of each reactor, is between 0.05 $h^{-1}$ and 10.0 $h^{-1}$, preferably between 0.10 $h^{-1}$ and 2.0 $h^{-1}$ and in a preferred way between 0.10 $h^{-1}$ and 1.0 $h^{-1}$.

According to one or more embodiments, the hourly space velocity (cHSV) of the feedstock, with respect to the volume of each catalyst, is between 0.06 $h^{-1}$ and 17.0 $h^{-1}$, preferably between 0.12 $h^{-1}$ and 3.0 $h^{-1}$ and in a preferred way between 0.12 $h^{-1}$ and 1.60 $h^{-1}$.

According to one or more embodiments, the amount of hydrogen mixed with the heavy hydrocarbon feedstock is preferably between 50.0 and 5000.0 standard cubic meters ($Sm^3$) per cubic meter ($m^3$) of liquid heavy hydrocarbon feedstock, such as between 100.0 and 3000.0 $Sm^3/m^3$ and preferably between 200.0 and 2000.0 $Sm^3/m^3$.

According to one or more embodiments, the hydroconversion is carried out in one or more three-phase hydroconversion reactors, which can be in series and/or in parallel, using the ebullated bed reactors technology.

According to one or more embodiments, the hydroconversion stage is carried out using the technology and under the conditions of the H-Oil™ process as described, for example, in the patents U.S. Pat. Nos. 4,521,295 and 4,495,060. In this implementation, each reactor is operated as a three-phase fluidized bed, also called an ebullated bed. According to one or more embodiments, each reactor comprises a recirculation pump which makes it possible to maintain the supported solid catalyst in an ebullating bed by continuous recycling of at least a part of a liquid fraction withdrawn at the top of the reactor and reinjected at the bottom of the reactor.

According to one or more embodiments, each reactor of the hydroconversion stage uses a different catalyst suitable for the heavy hydrocarbon feedstock which is sent to each reactor. According to one or more embodiments, several types of catalysts can be used in each reactor. According to one or more embodiments, each reactor can contain one or more supported solid catalysts.

The spent supported solid hydroconversion catalyst can, in accordance with the process according to the present description, be at least partly replaced by fresh supported solid catalyst by withdrawal, preferably at the bottom of the reactor, and by introduction, either at the top or at the bottom of the reactor, of fresh and/or spent and/or regenerated and/or rejuvenated supported solid catalyst, for example at regular time intervals and preferably sporadically or virtually continuously. The replacement of supported solid catalyst can be carried out, completely or partly, by spent and/or regenerated and/or rejuvenated supported solid catalyst resulting from the same reactor and/or from another reactor of any hydroconversion stage. The supported solid catalyst can be added with the metals in the form of metal oxides, with the metals in the form of metal sulfides, or after a preconditioning. According to one or more embodiments, for each reactor, the rate of replacement of the spent supported solid hydroconversion catalyst by fresh supported solid catalyst is between 0.01 kilogram and 10.0 kilograms per cubic meter of heavy hydrocarbon feedstock treated, and preferably between 0.1 kilogram and 3.0 kilograms per cubic meter of heavy hydrocarbon feedstock treated.

According to one or more embodiments, the withdrawal and the replacement are carried out using devices which make possible the continuous operation of the hydroconversion stage.

According to one or more embodiments, the spent supported solid catalyst withdrawn from the reactor is sent to a regeneration zone, in which the carbon and the sulfur which it includes are removed, and then to return the regenerated supported solid catalyst to the hydroconversion stage. According to one or more embodiments, the spent supported solid catalyst withdrawn from the reactor is sent to a rejuvenation zone, in which most of the metals deposited are removed, before sending the spent and rejuvenated supported solid catalyst to a regeneration zone, in which the carbon and the sulfur which it includes are removed, and then to return the regenerated supported solid catalyst to the hydroconversion stage.

The examples which follow illustrate the invention without, however, limiting the scope thereof.

EXAMPLES

Example 1: Preparation of an Aqueous Solution Containing the Keggin Heteropolyanion Salt $Ni_4SiMo_{11}O_{39}$ (in Accordance with the Invention)

α/ Dissolution of 22.3 g of silicomolybdic acid $H_4SiMo_{12}O_{40}.13H_2O$ (0.011 mol) in water, at 20° C. (yellow coloration, translucent), and addition of 8.2 g of Ba$(OH)_2.H_2O$ (0.043 mol), with stirring for 30 minutes (no change in coloration);
β/ Addition of 11.4 g of $NiSO_4.6H_2O$ (0.043 mol) to the mixture obtained on conclusion of stage a and stirring for 2 hours (the mixture becomes opaque, greenish);
γ/ Filtration on a sintered glass in order to separate the $BaSO_4$ precipitate (white solid) from the $Ni_4SiMo_{11}O_{39}$ solution;
water is added to the solution so as to adjust the $MoO_3$ concentration to 15.2% by weight in the solution.

The Ni/Mo atomic ratio of the solution is 0.36; its pH is equal to 5.

The solution of example 1 predominantly comprises the Keggin heteropolyanion salt $Ni_4SiMo_{11}O_{39}$.

Example 2: Preparation of an Aqueous Solution Containing the Anderson Heteropolyanion Salts $NiMo_6O_{24}H_6Ni_2$ and $Ni_2Mo_{10}O_{38}H_4Ni_4$ (in Accordance with the Invention)

α/ Dissolution of 21.6 g of molybdenum trioxide (the $H_2O_2$/Mo molar ratio being 6) in 102 g of aqueous hydrogen peroxide solution (30% purity in 70% water) for 16 hours at 20° C. (orange-yellow solution obtained);
β/ Addition over 20 minutes (exothermicity control and release of $CO_2$ observed) of 10.6 g of nickel hydroxycarbonate, still at 20° C. (Ni/Mo atomic ratio of 0.60);
water is added to the solution so as to adjust the $MoO_3$ concentration to 16.8% by weight in the solution.

In the end, the solution predominantly contains the salts of the Anderson HPAs $NiMo_6O_{24}H_6Ni_2$ and $Ni_2Mo_{10}O_{38}H_4Ni_4$. The pH of the final solution is 3.6.

Example 3: Preparation of an Aqueous Solution of Ammonium Heptamolybdate and of Nickel Nitrate (not in Accordance with the Invention)

Simultaneous dissolution of 29.7 g of ammonium heptamolybdate $(NH_4)_6Mo_7O_{24}.4H_2O$ and of 17.8 g of nickel nitrate $Ni(NO_3)_2.6H_2O$ in water in the presence of 9.5 g of aqueous hydrogen peroxide solution (30% purity in 70% water) at 20° C. for 15 minutes;
Addition of water to the solution, after complete dissolution of the precursors, so as to adjust the concentration of $MoO_3$ to 18.8% by weight in the solution. The Ni/Mo atomic ratio of the solution is 0.36; its pH is equal to 5.

The preparation of example 3 corresponds to a simple dissolution of the ammonium molybdate; there is no formation of heteropolyanion.

Example 4: Preparation of an Aqueous Solution with a pH of Less than 3.5 (not in Accordance with the Invention Dissolution of 33.1 g of molybdenum oxide, 9.8 g of nickel hydroxycarbonate and 12.7 g of orthophosphoric acid in water at 90° C. for 3 hours;
Addition of water to the solution, after complete dissolution of the precursors, so as to adjust the concentration of $MoO_3$ to 22.5% by weight in the solution.

The Ni/Mo atomic ratio of this solution is 0.36. The pH of the solution is 1.2.

Example 4 predominantly comprises the nickel salt of the Strandberg heteropolyanion $Ni_2H_2P_2Mo_5O_{23}$.

Example 5: Preparation of an Aqueous Solution with a pH of Greater than 3.5 Containing the Salt $Ni_{5/2}HP_2Mo_5O_{23}$ after Addition of Ammonia (in Accordance with the Invention)

Simultaneous dissolution of 54.0 g of molybdenum oxide, 16.0 g of nickel hydroxycarbonate and 20.7 g of orthophosphoric acid in water at 90° C. for 3 hours so that the $MoO_3$ concentration is 30.5% by weight in the solution;
Addition of 2.03 g of a 20% solution of ammonia in water to 29.6 g of the preceding solution, after complete dissolution of the precursors (the addition of ammonia may temporarily induce the formation of a precipitate which disappears rapidly with stirring);
Addition of water to the solution so as to adjust the $MoO_3$ concentration to 22.5% by weight in the solution.

The Ni/Mo atomic ratio of this solution is 0.36. The pH of the solution is 4.1. The solution of example 5 predominantly comprises the nickel salt of the Strandberg heteropolyanions $Ni_{512}HP_2Mo_5O_{23}$.

Example 6: Preparation of a Boehmite Cake (in Accordance with the Invention)

a) Addition of aluminum sulfate to a water heel, all at once, in a batch reactor heated to and maintained at 65° C. The change in the pH, which remains between 2.5 and 3, is followed for 10 minutes. During this stage, approximately 8 g of $Al_2O_3$ equivalent, with respect to the total weight of alumina formed on conclusion of the synthesis of the solid, were introduced into a volume of 1290 ml. Then a gradual addition of sodium aluminate is carried out with the objective of achieving a pH of between 7 and 10 in a period of time of 5 to 15 min;

b) Simultaneous addition of aluminum sulfate and of sodium aluminate in order for the pH to remain between 7 and 10. At the end of the simultaneous addition of the two reactants, 144 g of $Al_2O_3$ equivalent were poured in for a total volume of 3530 ml;

c) Filtration of the suspension thus obtained, carried out by displacement on a filtration frame of Buchner funnel type under vacuum with a sintered glass of P4 type, followed by three successive washing operations with 5l of distilled water.

The water content (or "loss on ignition") of the boehmite cake thus obtained is 71%.

Example 7: Preparation of a Catalyst C1 by Dry Impregnation of Alumina (not in Accordance with the Invention)

Filtration and washing of the boehmite cake obtained according to example 6, then drying at 120° C. for 16 hours in a ventilated oven and obtaining a dried solid with an LOI of 26%;
Mixing of the solid with an aqueous solution containing 52.7% nitric acid (1.0%, expressed by weight of acid with respect to the equivalent weight of alumina introduced) and kneading for 20 minutes in a Z-arm mixer;
Bringing the mixture into contact with an aqueous solution containing 20.3% ammonia (40 mol % of ammonia per mole of acid) for 5 minutes in the same mixer;
Shaping of the paste obtained, in a piston extruder with a die having trilobal orifices with a circumscribed diameter equal to 1.5 mm;
Drying of the grains overnight at 120° C.;
Calcination at 540° C. for 2.0 h, under an air flow containing 60 g of water/kg of dry air.

The trilobal alumina grains thus obtained have a diameter of 1.2 mm, a specific surface of 180 m$^2$/g, a total pore volume of 0.80 ml/g and a mesopore distribution centered on 11 nm (pore diameter at $V_{meso}/2$). This alumina additionally contains 0.20 ml/g of pore volume in the pores with a diameter of greater than 50 nm (macropore volume), i.e. a macropore volume equal to 25% of the total pore volume.

Dilution of the aqueous solution prepared according to example 4 in demineralized water so that the content of molybdenum oxide after calcination is 9% by weight, with respect to the total weight of dry catalyst;
Dry impregnation of the alumina thus obtained, by said aqueous solution;
Maturing of the catalyst for 16 hours in a humid atmosphere;
Drying at 120° C. for 24 hours;
Calcination under air at 450° C. for 2 hours.

There is thus obtained the catalyst C1 prepared by dry impregnation, starting from the aqueous solution described in example 4, on alumina, the preparation protocol of which is described with this example 7.

Example 8: Preparation of a Catalyst C2 by Cokneading Boehmite and an Aqueous Solution Containing the Salt Ni$_4$SiMo$_{11}$O$_{39}$ (in Accordance with the Invention)

c) Obtaining a boehmite cake as described in example 6, then drying under high and gradually increased vacuum, at a temperature of 20° C., for a period of time of 6 hours, and obtaining a cake with an LOI changing from 71% to 62% by weight;
d) Preparation of an aqueous solution as described in example 1;
e) Bringing 90.0 g of cake obtained on conclusion of stage c) into contact with 22.7 g of the solution obtained on conclusion of stage d) (weights adjusted so as to obtain 9% of MoO$_3$ on the final catalyst) for 2 minutes, and cokneading for 2 minutes in a Z-arm mixer in order to obtain a paste. The LOI of the paste is, at this stage, 66% by weight;
f) Shaping of the paste obtained, in a piston extruder, through a die having trilobal orifices with a circumscribed diameter equal to 1.5 mm in order to form grains;
g) Drying of the grains overnight at 120° C., then calcined at 540° C. for two hours under an air flow containing 60 g of water/kg of dry air.

Trilobal grains with a diameter of 1.2 mm, having a specific surface of 180 m$^2$/g, a total pore volume of 0.78 ml/g and a mesopore distribution centered on 11 nm (pd at $V_{meso}/2$), are thus obtained. This alumina additionally contains 0.20 ml/g of pore volume in the pores with a diameter of greater than 50 nm (macropore volume).

There is thus obtained the catalyst C2 prepared by cokneading the aqueous solution No. 1, the preparation of which is described with example 1, with the boehmite cake resulting from example 6.

Example 9: Preparation of a Catalyst C3 by Cokneading Boehmite and an Aqueous Solution Containing the Salts NiMo$_6$O$_{24}$H$_6$Ni$_2$ and Ni$_2$Mo$_{10}$O$_{38}$H$_4$Ni$_4$ (in Accordance with the Invention)

c) Obtaining a boehmite cake as described in example 6, then drying the cake under high and gradually increased vacuum, at a temperature of 20° C., for 6 hours, and obtaining a cake with an LOI changing from 71% to 62% by weight;
d) Preparation of an aqueous solution as described in example 2;
e) Bringing 90.0 g of cake obtained on conclusion of stage c) into contact with 20.7 g of the solution obtained on conclusion of stage d) (weights adjusted so as to obtain 9% of MoO$_3$ on the final catalyst) for 2 minutes, and cokneading for 2 minutes in a Z-arm mixer in order to obtain a paste. The LOI of the paste is, at this stage, 65% by weight;
f) Shaping of the paste obtained, in a piston extruder, through a die having trilobal orifices with a circumscribed diameter equal to 1.5 mm in order to form grains;
g) Drying of the grains overnight at 120° C., then calcined at 540° C. for 2.0 h under an air flow containing 60 g of water/kg of dry air.

Trilobal grains with a diameter of 1.2 mm, having a specific surface of 180 m$^2$/g, a total pore volume of 0.76 ml/g and a mesopore distribution centered on 11 nm (diameter of the pores at V/2) are thus obtained. This alumina additionally contains 0.22 ml/g of pore volume meso, in the pores with a diameter of greater than 50 nm (macropore volume).

There is thus obtained the catalyst C3 prepared by cokneading the aqueous solution No. 2, the preparation of which is described with example 2, with the boehmite cake resulting from example 6.

Example 10: Preparation of a Catalyst C4 by Cokneading Boehmite and an Aqueous Solution Obtained by Dissolution of Ammonium Heptamolybdate and Nickel Nitrate (not in Accordance with the Invention)

c) The boehmite cake prepared according to example 6 is subjected to a high vacuum at a temperature of 20° C., then the vacuum is increased for a period of time of 6 hours, with an LOI changing from 71% to 62% by weight.
e) Mixing 90 g of boehmite cake and 18.3 g of the aqueous solution resulting from example 3 (weights adjusted so as to obtain 9% of $MoO_3$ on the final catalyst) during an addition of 2 min, then the combined mixture is kneaded for 2 minutes (in a Z-arm mixer). The LOI of the paste is, at this stage, 65% by weight;
f) Shaping of the paste obtained in a piston extruder through a die having trilobal orifices with a circumscribed diameter equal to 1.5 mm;
g) Drying overnight at 120° C.;
h) Calcination at 540° C. for two hours under an air flow containing 60 g of water/kg of dry air.

Trilobal grains with a diameter of 1.2 mm, having a specific surface of
180 m²/g, a total pore volume of 0.78 ml/g and a mesopore distribution centered on 11 nm (pd at $V_{meso}/2$), are thus obtained. This alumina additionally contains 0.21 ml/g of pore volume in the pores with a diameter of greater than 50 nm (macropore volume).

There is thus obtained the catalyst C4 prepared by cokneading the aqueous solution No. 3, the preparation of which is described with example 3, with the boehmite cake resulting from example 6.

Example 11: Preparation of a Catalyst C5 by Cokneading Boehmite and an Aqueous Solution with a pH of Less than 3.5 (not in Accordance with the Invention)

The boehmite cake prepared according to example 6 is subjected to a high vacuum at a temperature of 20° C., then the vacuum is increased for a period of time of 6 hours, with an LOI changing from 71% to 62% by weight.
Mixing 90 g of boehmite cake and 15.7 g of the aqueous solution resulting from example 4 (weights adjusted so as to obtain 9% of $MoO_3$ on the final catalyst) during an addition of 2 min, then the combined mixture is kneaded for 2 minutes (in a Z-arm mixer). The LOI of the paste obtained is, at this stage, 63% by weight;
Shaping of the paste obtained in a piston extruder through a die having trilobal orifices with a circumscribed diameter equal to 1.5 mm;
On conclusion of this kneading, the paste obtained is passed through a die having trilobal orifices with a circumscribed diameter equal to 1.5 mm on a piston extruder;
Drying overnight at 120° C.;
Calcination at 540° C. for two hours under a humid air flow containing 60 g of water/kg of dry air.
Trilobal grains with a diameter of 1.2 mm, having a specific surface of
180 m²/g, a total pore volume of 0.40 ml/g and a mesopore distribution centered on 7 nm (pd at $V_{meso}/2$);
are thus obtained. This alumina additionally contains 0.12 ml/g of pore volume in the pores with a diameter of greater than 50 nm (macropore volume). The high loss in pore volume is explained by dissolution/reprecipitation effects of the boehmite in contact with the strongly acidic impregnation solution.

There is thus obtained the catalyst C5 prepared by cokneading the aqueous solution No. 4, the preparation of which is described with example 4, with the boehmite cake resulting from example 6.

Example 12: Preparation of a Catalyst C6 by Cokneading Boehmite and an Aqueous Solution with a pH of Greater than 3.5 (in Accordance with the Invention)

c) Obtaining a boehmite cake as described in example 6, then drying the cake under high vacuum, at a temperature of 20° C., for 6 hours, and obtaining a cake with an LOI changing from 71% to 62% by weight;
d) Preparation of an aqueous solution as described in example 5;
e) Bringing 90.0 g of cake obtained on conclusion of stage c) into contact with 15.7 g of the solution obtained on conclusion of stage d) (weights adjusted so as to obtain 9% of $MoO_3$ on the final catalyst) for 2 minutes, and cokneading for 2 minutes in a Z-arm mixer in order to obtain a paste. The LOI of the paste is, at this stage, 63% by weight;
f) Shaping of the paste obtained, in a piston extruder, through a die having trilobal orifices with a circumscribed diameter equal to 1.5 mm in order to form grains;
g) Drying of the grains overnight at 120° C., then calcined at 540° C. for 2.0 h under an air flow containing 60 g of water/kg of dry air.

Trilobal grains with a diameter of 1.2 mm, having a specific surface of
180 m²/g, a total pore volume of 0.80 ml/g and a mesopore distribution centered on 11 nm (pd at $V_{meso}/2$), are thus obtained. This alumina additionally contains 0.21 ml/g of pore volume in the pores with a diameter of greater than 50 nm (macropore volume).

There is thus obtained the catalyst C6 prepared by cokneading the aqueous solution No. 5, the preparation of which is described with example 5, with the boehmite cake resulting from example 6.

Example 13: Evaluation of the Catalysts C1, C2, C3, C4, C5 and C6 in Hydrotreating and Hydroconversion of Residues The catalysts were subjected to a catalytic test, in a closed and perfectly stirred batch reactor, on a heavy hydrocarbon feedstock of VR type (table 1).

TABLE 1

| Main characteristics of the VR feedstock employed ||
| --- | --- |
| Feedstock | VR |
| Density (g/ml) | 1.024 |
| Sulfur (% by weight) | 4.9 |
| Nitrogen (ppm) | 4495 |
| Viscosity at 100° C. (cSt) | 3306 |
| Conradson carbon (% by weight) | 21.6 |
| $C_7$ asphaltenes (% by weight) | 12.6 |
| Ni (ppm) | 51 |
| V (ppm) | 165.9 |
| SD: IP ° C. | 306 |
| SD: 05% vol. ° C. | 476 |
| SD: 10% vol. ° C. | 504 |
| SD: 20% vol. ° C. | 537 |
| SD: 30% vol. ° C. | 568 |
| SD: 40% vol. ° C. | 600 |
| SD: 60% vol. ° C. | 673 |

SD = simulated distillation
IP = initial boiling point

To do this, after a stage of ex situ sulfidation by circulation of an $H_2S/H_2$ gas mixture for 2 hours at 350° C., 20 ml of catalyst are charged with the exclusion of air to the batch-wise reactor and then the catalyst is covered with 120 ml of feedstock. The operating conditions are as follows:
temperature: 400° C.
total pressure: 14.5 MPa
time: 3 h
stirring speed: 900 rpm At the end of the test, a material balance is carried out by weighing all of the solid, liquid and gas phases formed. The HDX rate is defined as follows:

$$HDX = \frac{w_{feedstock}[X]_{feedstock} - w_{product}[X]_{product}}{w_{feedstock}[X]_{feedstock}} \times 100 \quad \text{Equation 1}$$

where X corresponds to the contents of $C_7As$, S, V, CCR or 540° C.+ in the liquid effluents and w corresponds to the weight of feedstock ($w_{feedstock}$) or the weight of liquid effluent recovered at the end of the test ($w_{product}$).

The performance qualities of the catalysts are summarized in table 2. The catalysts C2, C3 and C6, in accordance with the invention, exhibit $HDC_7As$, HDS, HDV and HDCCR performance qualities:
which are superior to the performance qualities of the catalyst C4 prepared by cokneading boehmite and an aqueous solution devoid of heteropolyanions but containing molybdate and nitrate ions,
which are superior to the performance qualities of the catalyst C5 prepared by cokneading boehmite and an excessively acidic aqueous solution,
which are equivalent to the performance qualities of the catalyst C1 prepared according to a not very integrated multistage process.

TABLE 2

| | Performance qualities of the catalyst | | | | |
|---|---|---|---|---|---|
| Catalysts | $HDC_7As$ (% weight) | HDS (% by weight) | HDV (% by weight) | HDCCR (% by weight) | $HD_{540° C.+}$ (% by weight) |
| C1 (comparative) | 59 +/− 3 | 55 +/− 2 | 81 +/− 4 | 45 +/− 2 | 50 +/− 2 |
| C2 (invention) | 56 +/− 3 | 53 +/− 2 | 78 +/− 4 | 44 +/− 2 | 48 +/− 2 |
| C3 (invention) | 59 +/− 3 | 53 +/− 2 | 82 +/− 4 | 43 +/− 2 | 49 +/− 2 |
| C4 (comparative) | 47 +/− 3 | 39 +/− 2 | 67 +/− 4 | 37 +/− 2 | 50 +/− 2 |
| C5 (comparative) | 25 +/− 3 | 40 +/− 2 | 39 +/− 4 | 39 +/− 2 | 51 +/− 2 |
| C6 (invention) | 57 +/− 3 | 55 +/− 2 | 77 +/− 4 | 45 +/− 2 | 48 +/− 2 |

The invention claimed is:

1. A process for preparing a catalyst comprising an active phase comprising molybdenum and nickel and/or cobalt, and an oxide matrix containing alumina, said catalyst comprising a total pore volume of at least 0.6 ml/g, a macropore volume of between 10.0% and 40.0% of the total pore volume, a mesopore volume of at least 0.5 ml/g and a mean mesopore diameter of greater than 5.0 nm, comprising the following stages:
a) a stage of preparing an aqueous solution of aluminum precursors comprising a first acidic precursor, chosen from aluminum sulfate, aluminum chloride, aluminum nitrate and their mixtures, and a first basic precursor, chosen from sodium aluminate, potassium aluminate, ammonia, sodium hydroxide, potassium hydroxide and their mixtures;
b) a stage of bringing the solution obtained on conclusion of stage a) into contact with a second basic precursor, chosen from sodium aluminate, potassium aluminate, ammonia, sodium hydroxide, potassium hydroxide and their mixtures, and with a second acidic precursor chosen from aluminum sulfate, aluminum chloride, aluminum nitrate, sulfuric acid, hydrochloric acid, nitric acid and their mixtures, in order to obtain a suspension, with at least one of the second basic or acidic precursors comprising aluminum, wherein a relative flow rate of the second acidic and basic precursors being chosen so as to obtain a pH of the suspension of between 7.0 and 10.0 and the flow rate of the second acidic and/or basic precursor(s), which contain aluminum, being adjusted so as to obtain a concentration as alumina equivalent in the suspension of between 10.0 and 80.0 g/l, at a temperature of between 20.0 and 90.0° C. and over a time of between 1 and 75 minutes;
c) filtering and washing the suspension obtained in stage b) in order to obtain a boehmite cake;
d) preparing a clear aqueous solution at a pH of between 3.5 and 8.0, comprising a salt of heteropolyanion of Keggin and/or lacunary Keggin and/or substituted lacunary Keggin and/or Anderson and/or Strandberg type or their mixtures, said salt exhibiting, in its structure, molybdenum and cobalt and/or nickel;
e) co-kneading the boehmite cake obtained on conclusion of stage c) with the clear aqueous solution obtained on conclusion of stage d) in order to form a paste;
f) shaping the paste obtained on conclusion of stage e) in order to form grains of catalyst precursor;
g) drying the grains obtained on conclusion of stage f), at a temperature of less than 250.0° C., in order to obtain dried grains of catalyst precursor; and
h) calcining the dried grains obtained on conclusion of stage g), at a temperature of between 250.0 and 1000.0° C.

2. The process as claimed in claim 1, in which stage a) comprises two operations:
i) dissolving the first acidic precursor in water, and
ii) bringing the resultant solution into contact with the first basic precursor, in order to adjust the pH of said solution.

3. The process as claimed in claim 1, in which stage a) comprises two operations:
i') bringing the first acidic precursor and the first basic precursor into contact in water, and
ii') heating the suspension obtained on conclusion of stage i').

4. The process as claimed in claim 1, in which the heteropolyanion salt is one of the following:
a heteropolyanion of Keggin, lacunary Keggin or substituted lacunary Keggin type, according to formula (I):

where:
C is an $H^+$ cation and/or a substituted or unsubstituted quaternary ammonium cation,
p is an integer between 0 and 6;
X is an $Ni^{2+}$ cation or a $Co^{2+}$ cation,
x is an integer between 0 and 11;
p+x is an integer between 3 and 11;
A is phosphorus or silicon or boron;
g is 0 or 1;
Mo is molybdenum,
W is tungsten,
m is an integer between 1 and 12;
n is an integer between 0 and 11;
m+n=9 or 11 or 12;

X' is an element from Group VIII of the Periodic Table;
z is 0 or 1,
x+z is an integer greater than or equal to 1,
O is oxygen,
y is an integer equal to 34 or 39 or 40;
H is hydrogen,
h is an integer between 0 and 3; and
the structure $A_gMo_mW_nX'_zO_yH_h$ is a negatively charged heteropolyanion, its charge being equal to −(p+x);

a heteropolyanion of Anderson type, of formula (II):

$$A_aMo_mW_nO_yH_hM_{x/2} \qquad (II)$$

where:
A is nickel or cobalt,
a is 1 or 2,
Mo is molybdenum,
W is tungsten,
m is an integer between 1 and 10;
n is an integer between 0 and 9;
m+n is 6 or 10,
O is oxygen,
y is 24 or 38,
H is hydrogen,
h is 4 or 6,
the structure $A_aMo_mW_nO_yH_h$ is a negatively charged heteropolyanion, its charge being equal to −x,
M is a cation of one of the elements from Group VIII of the Periodic Table; and
x is an integer between 3 and 8;

a heteropolyanion of Strandberg type, of formula (II):

$$M_{(6-h)/2}H_hP_2Mo_mW_nO_{23} \qquad (III)$$

where:
M is a $Ni^{2+}$ cation or a $Co^{2+}$ cation,
H is hydrogen,
h is an integer between 0 and 2,
P is phosphorus,
Mo is molybdenum,
W is tungsten,
m is an integer between 1 and 5;
n is an integer between 0 and 4;
m+n=5,
O is oxygen,
the structure $H_hP_2Mo_mW_nO_{23}$ is a negatively charged heteropolyanion, its charge being equal to h−6.

5. The process as claimed in claim 4, in which the heteropolyanion salt is of the Anderson type, of formula (II).

6. The process as claimed in claim 4, in which the heteropolyanion salt, present alone or in a mixture, is: $Ni_{3/2}PMo_{12}O_{40}$, $Ni_2SiMo_{12}O_{40}$, $Ni_3Mo_{12}O_{40}H_2$, $Ni_4SiMo_{11}O_{39}$, $Ni_{7/2}PMo_{11}O_{39}$, $Ni_3SiMo_{11}NiO_{40}H_2$, $Ni_3PMo_{11}NiO_{40}H$, $Co_{3/2}PMo_{12}O_{40}$, $Co_2SiMo_{12}O_{40}$, $Co_3Mo_{12}O_{40}H_2$, $Co_4SiMo_{11}O_{39}$, $Co_{7/2}PMo_{11}O_9$, $Co_3SiMo_{11}CoO_{40}H_2$, $Co_3SiMo_{11}NiO_{40}H_2$, $Ni_3SiMo_{11}CoO_{40}H_2$, $Co_3PMo_{11}CoO_{40}H$, $Co_3PMo_{11}NiO_{40}H$, or $Ni_3PMo_{11}CoO_{40}H$.

7. The process as claimed in claim 4, in which the heteropolyanion salt, present alone or in a mixture, is: $CoMo_6O_{24}H_6Co_{3/2}$, $CoMo_6O_{24}H_6Ni_{3/2}$, $CoMo_6O_{24}H_6Co_2$, $CoMo_6O_{24}H_6Ni_2$, $NiMo_6O_{24}H_6Ni_2$, $NiMo_6O_{24}H_6Co_2$, $Co_2Mo_{10}O_{38}H_4Co_3$, $Co_2Mo_{10}O_{38}H_4Ni_3$, $Ni_2Mo_{10}O_{38}H_4Co_4$, or $Ni_2Mo_{10}O_{38}H_4Ni_4$.

8. The process as claimed in claim 4, in which the heteropolyanion salt, present alone or in a mixture, is: $Co_2H_2P_2Mo_5O_{23}$, $Co_{5/2}HP_2Mo_5O_{23}$, $Co_3P_2Mo_5O_{23}$, $Ni_2H_2P_2Mo_5O_{23}$, $Ni_{5/2}HP_2Mo_5O_{23}$, or $Ni_3P_2Mo_5O_{23}$.

9. The process as claimed in claim 1, in which the catalyst exhibits a micropore volume of less than 0.05 ml/g.

10. The process as claimed in claim 1, in which the catalyst has a molybdenum content of between 2.0% and 18.0% by weight of molybdenum trioxide, with respect to the total weight of the catalyst.

11. The process as claimed in claim 1, in which the catalyst has a content of cobalt and/or nickel metal of between 0.25% and 5.0% by weight of cobalt and/or nickel oxide, with respect to the total weight of the catalyst.

12. The process as claimed in claim 1, in which the catalyst additionally comprises tungsten, at a content of between 2.0% and 18.0% by weight of tungsten trioxide, with respect to the total weight of the catalyst.

13. The process as claimed in claim 1, in which the catalyst additionally comprises silicon or boron or phosphorus, at a content of between 0.1% and 8.0% by weight of silicon oxide or of phosphorus oxide or of boron oxide, with respect to the total weight of the catalyst.

14. The process as claimed in claim 1, in which the solution comprising the heteropolyanion salt is prepared according to the following stages:
α/ dissolving a molybdenum precursor, and optionally a tungsten precursor, with an oxoacid compound and/or an oxidizing agent and/or a base, in water;
β/ adding a nickel and/or cobalt precursor to the solution obtained on conclusion of stage α/;
γ/ optionally removing a solid formed on conclusion of stage β/ in order to obtain a clear aqueous solution comprising a heteropolyanion salt;
δ/ optionally, adjusting the pH of the aqueous solution, by adding an organic base, to a value of between 3.5 and 8.0.

15. The process as claimed in claim 14, in which stage δ/ is carried out in case where the pH of the solution resulting from stage β/ or γ/ is less than 3.5.

16. A process for hydrotreating and/or hydroconversion of a heavy hydrocarbon feedstock containing at least 50.0% by weight of hydrocarbons having a boiling point of greater than 300° C., with respect to the weight of the heavy hydrocarbon feedstock, and at least 1.0% by weight of hydrocarbons having a boiling point of greater than 540° C., with respect to the weight of the heavy hydrocarbon feedstock, said process being carried out in the presence of a catalyst prepared according to claim 1.

* * * * *